Patented Aug. 31, 1926.

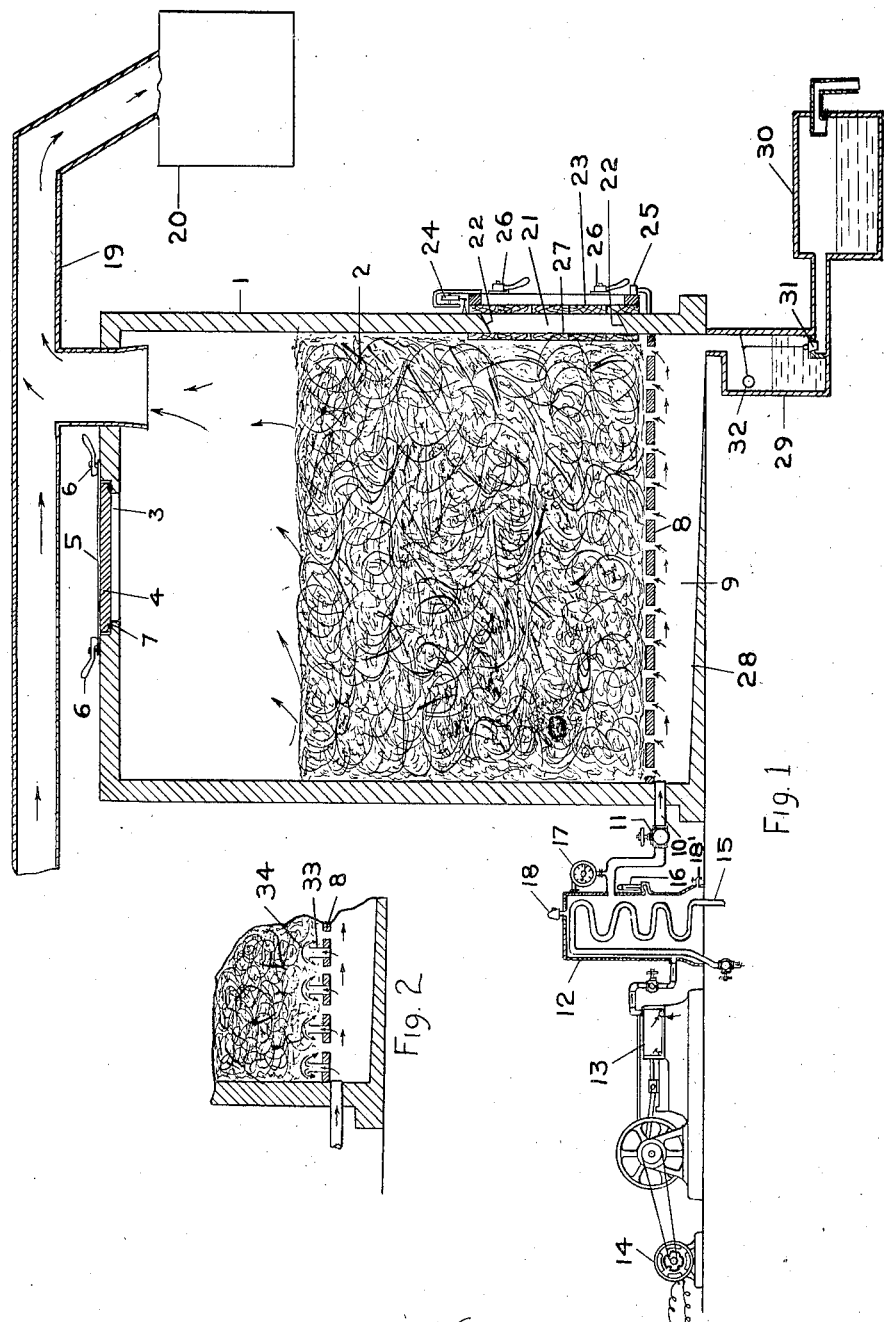

1,597,724

UNITED STATES PATENT OFFICE.

EDWARD PAYSON COOKE, OF PATERSON, NEW JERSEY, ASSIGNOR TO AMERICAN BECCARI CORPORATION, OF NEW YORK, N. Y., A CORPORATION OF NEW YORK.

APPARATUS FOR TRANSFORMING ORGANIC MATTER.

Application filed June 2, 1923. Serial No. 643,088.

This invention relates to a fermentation process for transforming organic matter into a form in which its nitrogen is readily available for agriculture. The invention is particularly adapted for use in disposing of waste organic matter, such as garbage and other organic refuse, as the resultant product is odorless and not infectious. At the same time it contains the nitrogenous constituents of the original material in a form in which they are readily available for use as organic fertilizers. On account of these characteristics the invention may also be used simply for the production of organic fertilizers by the fermentation of substances suitable for this purpose.

A process of this general nature has heretofore been practiced by placing the material in a chamber for a sufficient time to allow the fermenting action to convert the material into a harmless, odorless mass. The air required for the bacterial actions of fermentation is obtained by natural upward circulation around and through the material in the chamber, the air entering the chamber through ports below the material and the gaseous products of fermentation passing from the chamber over suitable substances for absorbing their offensive constituents. The process may thus be carried out without contaminating the surrounding air, which is of particular advantage as it permits the apparatus to be used in communities where other methods of garbage and organic refuse disposal cannot well be employed.

During the process of fermentation liquids of different compositions containing some of the micro-organisms peculiar to fermentation drain from the mass and it is the practice to collect these liquids in order that the micro-organisms which they contain may be conserved for re-introduction into the fermenting mass or for accelerating an initial fermentation in a freshly filled cell.

The present invention has for its general object the provision of a method for producing fermentation of organic matter by confining it within a chamber to which air is supplied in sufficient quantity to support life in the micro-organisms favorable to fermentation, which exist in the mass of material, and at the same time to so oxidize the mass as to promote the propagation of additional micro-organisms to aid in the process of fermentation, without a too rapid increase of temperature and with the avoidance of a temperature so high as to destroy the micro-organisms necessary or this purpose.

A further object of the invention is the provision of an air supply for the fermentation chamber, the temperature of which may be regulated to that best adapted to promote fermentation of the material.

Another object of the invention is the provision of an arrangement for collecting the liquids discharged from the cell during the fermentation process, without permitting the escape of air from the chamber through the liquid collecting tanks.

These objects of the invention, as well as others which will hereinafter appear are attained by carrying out the fermentation process in a chamber which is normally sealed against the direct introduction of air from the external atmosphere, but into which air may be admitted under a pressure sufficiently great to cause it to permeate all parts of the mass, but not to pass so rapidly through the mass as to cause a dehydrating or drying effect. In other words, the supply of air will be sufficiently copious to maintain the micro-organisms favorable to fermentation, but will not be so copious as to retard the propagation of additional micro-organisms desirable for this purpose.

The floor of the chamber is provided with a drain leading to an inner sump into which the liquids collecting in the bottom of the chamber flow. The sump is connected to an outer and larger sump by an automatic valve adapted to open when the inner sump has become filled, but the time during which the valve remains open is so short that there is substantially no loss of air pressure within the chamber due to possible leakage of air through the valve between the sumps. The liquid collected in the outer sump may be subsequently supplied to the fermenting mass or may be used for initiating and accelerating fermentation in a freshly filled chamber.

The particular nature of the invention, as well as other objects and advantages thereof will appear more clearly from a description of a preferred embodiment as shown in the accompanying drawing in which Fig. 1 is an elevation in section of an apparatus for carrying out the invention, and Fig. 2 is a fragmentary view of a modified form of apparatus particularly adapted for use when the material to be fermented contains a relatively large proportion of moisture.

In the drawing, 1 represents a chamber of suitable capacity and proportions best adapted for the treatment of the material 2 which is to be disposed of. The material may be supplied to the chamber through an opening 3 provided with a cover 4 adapted to be clamped in place by any suitable devices such as a bar 5 with clamps 6 at its ends. If necessary a gasket 7 of any suitable material may be employed to form an air-tight joint at the cover.

The material rests upon a grating 8 arranged above the bottom of the chamber to form a space 9 into which air under pressure may be supplied through a pipe 10 provided with a controlling valve 11 and leading to a storage tank 12 into which air is supplied and maintained under the desired pressure by an air compressor 13 driven by any suitable source of power, such as an electric motor 14. For the purpose of regulating the temperature of the air within the tank a coil 15 is provided through which a heating or cooling fluid may flow, or an electrical resistance unit may be used in case the air requires only to be heated. The tank is preferably provided with a thermometer 16, pressure gauge 17, safety valve 18 and drain cock 18'.

For the purpose of removing the gaseous products of fermentation the top of the chamber is in communication with a conduit 19 leading to absorption apparatus 20 for taking out of the discharged gases the noxious constituents, but since this absorption apparatus may be of any suitable construction it is indicated only diagrammatically on the drawing.

An aperture 21 is provided at the bottom of one of the walls of the chamber to permit the material to be removed after fermentation has taken place. The upper and lower edges 22 of this opening are preferably inclined downwardly and inwardly to cause any liquid collecting on these surfaces to drain back into the chamber. The opening 21 is closed by a door 23 preferably of the sliding type mounted upon a track 24 and held in place at its lower edge by rollers 25. Clamps 26 are provided for holding the door tightly against the outer face of the wall of the chamber when it is in position over the opening 21. To more effectively close the opening 21 an inner door 27 may be provided. This door is shown as composed of a number of planks placed against the inner face of the wall of the chamber and held against the same by the pressure of the material.

The bottom of the chamber is inclined as at 28 to permit liquids draining from the mass of material through the grating 8 to flow into an inner sump 29 which at its bottom is provided with a discharge port leading to an outer sump 30. The port is normally closed by a valve 31 connected to a float 32 which is raised when the liquid in the inner sump reaches a predetermined level to lift the valve and permit some of the liquid to flow from this sump into the outer sump, but even during the time when the liquid is flowing there will be a considerable quantity of it above the valve so that there is little or no tendency for the air to escape from the chamber through the valve.

In Fig. 2 there is shown a modified form of grating particularly adapted for use in cases where the material in the chamber has a large moisture content or is of such a nature that it would be so compact above the grating as to prevent the free passage of air through the grating and into the mass. In this modified arrangement the grating 8 is provided with upwardly extending pipes 33 having caps or hoods 34 upon which the material rests while permitting air to flow from beneath the caps.

In the operation of the apparatus described above a charge of refuse material will be supplied to the chamber after which the door 4 will be clamped in place. Air under pressure will then be supplied to the space 9 from the tank 12, the pressure being regulated by the valve 11 to an amount sufficient to cause the air to permeate all parts of the mass of material to maintain the micro-organisms favorable to fermentation in the best condition and in the greatest quantities. The pressure should not, however, be so high as to cause the air to pass so rapidly through the mass as to exert a dehydrating or drying effect upon the material, since the conversion of the material into a harmless, odorless form depends upon the effectiveness of the fermentation process instead of upon a drying process.

The fermentation during its early stages produces a rapid increase of the temperature of the mass of material. (Careful investigations have proven that the mass attains a temperature of approximately 145° Fahrenheit during the first fifteen days.) This rise in temperature is due to the fermenting of the mass through the increase of the micro-organisms contained therein. The air therefore should be supplied in quantities sufficient to cause a rapid and natural propagation of these organisms, but should not be supplied in sufficient quantity to effect a dehydrating or drying of the mass. Further-more, the air supply should be so governed and controlled as to prevent an over-oxidization in the mass with a consequent increase in temperature which would tend to raise the temperature of the mass to a point unfavorable to the propagation of micro-organisms or cause spontaneous combustion.

The temperature of the air supplied to the mass may be regulated by the coil 15 in the tank 12 so that the temperature of the air taken in connection with the temperature of the mass resulting from the fermentation action may be regulated to the degree most suitable for effective operation of the apparatus.

The air as it passes through the mass becomes merged with the gaseous products of fermentation which pass into the conduit 19 and then to the absorption apparatus 20 where the injurious and offensive constituents are removed so that the resultant product ultimately discharged from the apparatus is free from contamination, whereby the process may be carried out without nuisance or menace to the health of the community.

The liquids which drain from the mass during the fermentation process and which contain the micro-organisms favorable to fermentation will ultimately be collected in the outer sump 30 from which they may be removed as desired for use in accelerating the initial fermentation process in a newly filled cell or they may be conserved in connection with the cell from which they have drained by being re-introduced into the cell from time to time, if the charge in that cell should become too dry.

While in the preferred embodiment of the invention disclosed herein the air is supplied to the bottom of the chamber and the gaseous products of fermentation are removed from the top of the chamber, it will be understood that the air may be supplied to the chamber at other points and the gaseous products of fermentation may be discharged in other directions. It will also be understood that various changes in the details of construction of the apparatus may be made without departing from the principle of the invention as defined in the appended claims.

I claim:—

1. A fermentation process for transforming organic matter into a form in which its nitrogen is available, which consists in confining the matter within a chamber, supplying air to the chamber to permeate the matter and maintain and propagate the micro-organisms peculiar to fermentation and regulating the temperature of the air in accordance with fermentation requirements.

2. A fermentation process for transforming organic matter into a form in which its nitrogen is available, which consists in confining the matter within a chamber, supplying air under pressure to the chamber to permeate the matter and maintain and propagate the micro-organisms peculiar to fermentation and regulating the temperature of the air in accordance with fermentation requirements.

3. A fermentation process for transforming organic matter into a form in which its nitrogen is available, which consists in confining the matter within a chamber normally sealed against the direct introduction of air from the external atmosphere, supplying air under pressure to the chamber to permeate the matter and maintain and propagate the micro-organisms peculiar to fermentation and regulating the temperature of the air in accordance with fermentation requirements.

4. In apparaus for transforming organic matter into a form in which its nitrogen is available, the combination of a chamber, means for supplying air under pressure to the chamber to maintain and propagate the micro-organisms peculiar to fermentation, means for regulating the pressure of the air supplied to the chamber and means for discharging the gaseous products of fermentation from the chamber.

5. In apparatus for transforming organic matter into a form in which its nitrogen is available, the combination of a chamber, means for supplying air under pressure to the chamber to maintain and propagate the micro-organisms peculiar to fermentation, means for regulating the pressure of the air supplied to the chamber and means for removing from the gaseous products of fermentation discharged from the chamber the offensive constituents therein.

6. In apparatus for transforming organic matter into a form in which its nitrogen is available, the combination of a chamber, means for supplying air to the chamber to maintain and propagate the micro-organisms peculiar to fermentation and means for regulating the temperature of the air in accordance with fermentation requirements.

7. In apparatus for transforming organic matter into a form in which its nitrogen is available, the combination of a chamber, means for supplying air under pressure to the chamber to maintain and propagate the micro-organisms peculiar to fermentation, means for regulating the pressure of the air and means for regulating the temperature of the air in accordance with fermentation requirements.

8. In apparatus for transforming organic matter into a form in which its nitrogen is available, the combination of a chamber, means for supplying air under pressure to the chamber to maintain and propagate the micro-organisms peculiar to fermentation, means for regulating the pressure of the air, means for regulating the temperature of the air in accordance with fermentation requirements and means for removing from the gaseous products of fermentation discharged from the chamber the offensive constituents therein.

9. In apparatus for transforming organic matter into a form in which its nitrogen is available, the combination of a chamber adapted to receive the matter, means for supplying air under pressure to the chamber to maintain and propagate the micro-organisms peculiar to fermentation, means for draining from the chamber the liquid products resulting from fermentation and means for discharging from the draining means the liquid collected therein while preventing escape of air from the chamber through the draining means.

10. In apparatus for transforming organic matter into a form in which its nitrogen is available, the combination of a chamber adapted to receive the matter, means for supplying air under pressure to the chamber to maintain and propagate the micro-organisms peculiar to fermentation, means in communication with the chamber for collecting the liquid products resulting from fermentation, means in communication with the collecting means adapted to receive liquid therefrom and automatic means for controlling the discharge of liquid from the collecting means to the receiving means while preventing the escape of air from the chamber.

11. In apparatus for transforming organic matter into a form in which its nitrogen is available, the combination of a chamber, means for supplying air under pressure to the chamber to maintain and propagate the micro-organisms peculiar to fermentation, an inner sump in communication with the chamber for receiving the liquid products of fermentation, an outer sump in communication with the inner sump and automatic means for controlling the discharge of liquid from the inner sump to the outer sump while preventing the escape of air from the chamber through the sumps.

In testimony whereof I affix my signature.

EDWARD PAYSON COOKE.